United States Patent [19]

Motonaga et al.

[11] Patent Number: 5,154,740
[45] Date of Patent: Oct. 13, 1992

[54] MEMBRANOUS GAS SEPARATOR

[75] Inventors: Akira Motonaga, Nagoya; Kensuke Kamada, Hiroshima; Jun Kamo, Hatsukaichi; Hiroshi Hosokawa, Ohtake, all of Japan

[73] Assignee: Mitsubishi Rayon Co., Ltd., Tokyo, Japan

[21] Appl. No.: 712,545

[22] Filed: Jun. 10, 1991

Related U.S. Application Data

[60] Division of Ser. No. 509,298, Apr. 16, 1990, Pat. No. 5,045,357, which is a continuation-in-part of Ser. No. 267,274, Nov. 4, 1988, abandoned.

[30] Foreign Application Priority Data

Dec. 9, 1987 [JP] Japan .................................. 311325

[51] Int. Cl.$^5$ .................... B01D 53/22; B01D 71/60
[52] U.S. Cl. .......................................... 55/158; 55/524
[58] Field of Search ................... 55/16, 68, 158; 427/255, 253, 255.6; 428/305.5, 306.6, 308.4, 312.6, 312.8, 315.5, 412, 430

[56] References Cited

U.S. PATENT DOCUMENTS

| | | | |
|---|---|---|---|
| 3,980,456 | 9/1976 | Browall | 55/158 |
| 4,264,642 | 4/1981 | Ferralli | 427/255.6 X |
| 4,354,857 | 10/1982 | Reiss | 55/158 X |
| 4,484,935 | 11/1984 | Zampini | 55/158 |
| 4,521,450 | 6/1985 | Bjorklund et al. | 427/255.6 X |
| 4,606,740 | 8/1986 | Kulprathipanja | 55/158 X |
| 4,652,283 | 3/1987 | Zampini et al. | 55/16 X |
| 4,657,564 | 4/1987 | Langsam | 55/158 X |
| 4,664,681 | 5/1987 | Anazawa et al. | 55/16 X |
| 4,696,835 | 9/1987 | Maus et al. | 427/255.6 X |
| 4,806,189 | 2/1989 | Kraus et al. | 55/158 X |

FOREIGN PATENT DOCUMENTS

| | | | |
|---|---|---|---|
| 0174918 | 3/1986 | European Pat. Off. | 55/158 |
| 0206133 | 12/1986 | European Pat. Off. | 427/255.6 |
| 56-035492 | 8/1981 | Japan . | |
| 60-097002 | 5/1985 | Japan | 55/158 |
| 61-035823 | 2/1986 | Japan | 55/158 |
| 62-042707 | 2/1987 | Japan | 55/158 |
| 62-110728 | 5/1987 | Japan | 55/158 |
| 62-110729 | 5/1987 | Japan | 55/158 |
| 62-282932 | 12/1987 | Japan | 427/255.6 |
| 63-010409 | 1/1988 | Japan | 427/255.6 |

OTHER PUBLICATIONS

J. P. Agrawal et al., *J. of Applied Polymer Science*, vol. 14 (1970) pp. 1303-1321.

*Primary Examiner*—Robert Spitzer
*Attorney, Agent, or Firm*—Oblon, Spivak, McClelland, Maier & Neustadt

[57] ABSTRACT

Disclosed is a membranous gas separator comprising (a) a porous substrate having an average pore diameter of not greater than 100 Å and (b) a $\pi$-electron conjugated conducting polymer retained within at least a part of the pores of the porous substrate in such a way that the pores are not blocked characterized in that retaining the $\pi$-electron conjugated conducting polymer within the pore is carried out by a chemical oxidative polymerization.

5 Claims, 5 Drawing Sheets

MEMBRANOUS GAS SEPARATOR

CROSS-REFERENCE TO RELATED APPLICATION

This application is a division of application Ser. No. 07/509,298, filed Apr. 16, 1990, now U.S. Pat. No. 5,045,357, which in turn is a continuation in part of Ser. No. 07/267,274, filed Nov. 4, 1988, now abandoned.

BACKGROUND OF THE INVENTION

1) Field of the Invention

The present invention relates to a membranous gas separator which is suitable for use in the separation, adsorption and concentration of gases.

2) Description of the Prior Art

In recent years, the separation of gases by means of a membrane has attracted much attention because the energy required for the separation is low. Among others, oxygen-enriching membranes which enable concentration of atmospheric oxygen are expected to find wide applications in the medical and industrial fields, and a variety of oxygen-enriching polymeric membranes have been proposed. Typically, such oxygen-enriching polymeric membranes are homogeneous membranes. Even when homogeneous membranes have micropores, their average diameter is generally 10 Å or less.

The separation of gases by means of such homogeneous membranes is based on the so-called solution-diffusion mechanism. More specifically, a gas mixture is separated by utilization of the difference in the solubility of gas molecules in the membrane material and of the difference in the diffusion rate of gas molecules in the membrane. A silicone membrane which is a typical polymeric membrane functioning on the basis of this mechanism, has a high permeability coefficient of oxygen, but its $O_2/N_2$ separation factor is as low as about 2. Also for membranes formed of other polymers, there is some correlation between the separation factor and the permeability coefficient. Thus, a polymeric material having a higher permeability coefficient tends to give a lower separation factor. Accordingly, the membranes which separate or concentrate gases from their mixture on the basis of this mechanism cannot have both a high permeability coefficient and a high separation factor at the same time.

On the other hand, the separation of gases by means of a porous body, as employed in the enrichment of uranium, is based on the utilization of a type of flow called "Knudsen flow". Knudsen flow is a flow in which the flowing gas molecules do not collide with each other and which is encountered in a relatively low pressure range. This type of flow is believed to occur when a gas is allowed to pass through a porous body having a pore diameter less than about one-tenth of the mean free path of the gas molecule at the existing pressure. It is known that a relatively high permeability coefficient can be obtained in the separation of a gas mixture by this mechanism. However, it has been theoretically established that the permeability constant of a gas is inversely proportional to the square root of the molecular weight of the gas molecule. Accordingly, it can be expected that the separation factor will be very low in cases where a mixture of gases having an equal molecular weight or showing a slight difference in molecular weight each other is to be separated. The separation of atmospheric $O_2$ and $N_2$ on this principle is not practicable because the theoretical separation factor for these gases is 0.94.

Since 1970, the separation of gases by utilization of a flow arising from the interaction between the pore surfaces of a porous membrane and gas molecules (i.e., anomalous diffusion flow) has been studied. For example, Agrawal and Sourirajan reported the separation of gases by means of a reverse osmosis membrane (i.e., cellulose acetate membrane) [J. Appl. Polymer Sci., 14, 1303-1321 (1970)]. Moreover, Nomi et al. disclosed that, when a membrane having an average pore diameter of 5 nm to 0.1 $\mu$m is used, anomalous diffusion flow occurs in specific pressure and temperature ranges (Japanese Patent Publication No. 35492/81). Both Agrawal et al. and Nomi et al. consider that anomalous diffusion flow is a flow arising from the adsorption of gas molecules to the pore surfaces. Anomalous diffusion flow, when utilized for the separation of a gas mixture, is said to give a higher separation factor than Knudsen flow.

However, the methods of gas separation proposed by Agrawal et al. and Nomi et al. are based on the utilization of anomalous diffusion flow as observed chiefly with hydrocarbons, and do not exhibit satisfactorily high separation efficiency for inorganic gas mixtures (e.g., air). The reason for this is that there has been no suitable porous membrane material capable of interacting with inorganic gas molecules to induce anomalous diffusion.

On the other hand, electrical conductors comprising an electrically conducting polymer laminated to sheet materials or incorporated in film materials are known.

However, in electrical conductors including an electrically conducting polymer, the polymer is usually retained in the form of a layer. This structure itself is not suitable for the separation of gases by utilization of anomalous diffusion flow.

Japanese Patent Laid-Open No. 110729/1987 also discloses a membranous gas separator which retains polypyrrole by electrolytic polymerization in a porous substrate of an organic polymer. Electrolytic polymerization, however, requires complex procedures for connecting the electrode with the porous substrate. When the porous substrate has a large area, it is difficult to conduct polymerization by causing the electric current to flow uniformly over the whole substrate. When a tube having a small diameter is used for the porous substrate, it is difficult to attach the electrode on the inner surface of the tube.

As a result of great efforts to develop a membrane material having a high separation factor for various gas mixtures, the present inventors found that a $\pi$-electron conjugated conducting polymer has a unique affinity for gas molecules, particularly $O_2$ and $N_2$ molecules (i.e., such a polymer allows $O_2$ to permeate selectively as compared with $N_2$ and, moreover, adsorbs $O_2$ preferentially to $N_2$), and completed a technique for depositing such a polymer within the pores of a porous substrate. The present invention is based on this technique.

SUMMARY OF THE INVENTION

It is an object of the present invention to provide a membranous gas separator in which a polymer is retained in the pores without blocking the pores.

It is another object of the present invention to provide a membranous gas separator in which the thickness of the separating layer formed in the pores can be controlled and decreased as desired.

According to the present invention, there is provided a membranous gas separator comprising (a) a porous substrate having an average pore diameter of not greater than 100 Å and (b) a π-electron conjugated conducting polymer retained within at least a part of the pores of said porous substrate in such a way that the pores are not blocked thereby, characterized in that retaining the π-electron conjugated conducting polymer within the pore is carried out by a chemical oxidative polymerization.

DETAILED DESCRIPTION OF THE PREFERRED EMBODIMENTS

Figure 1:
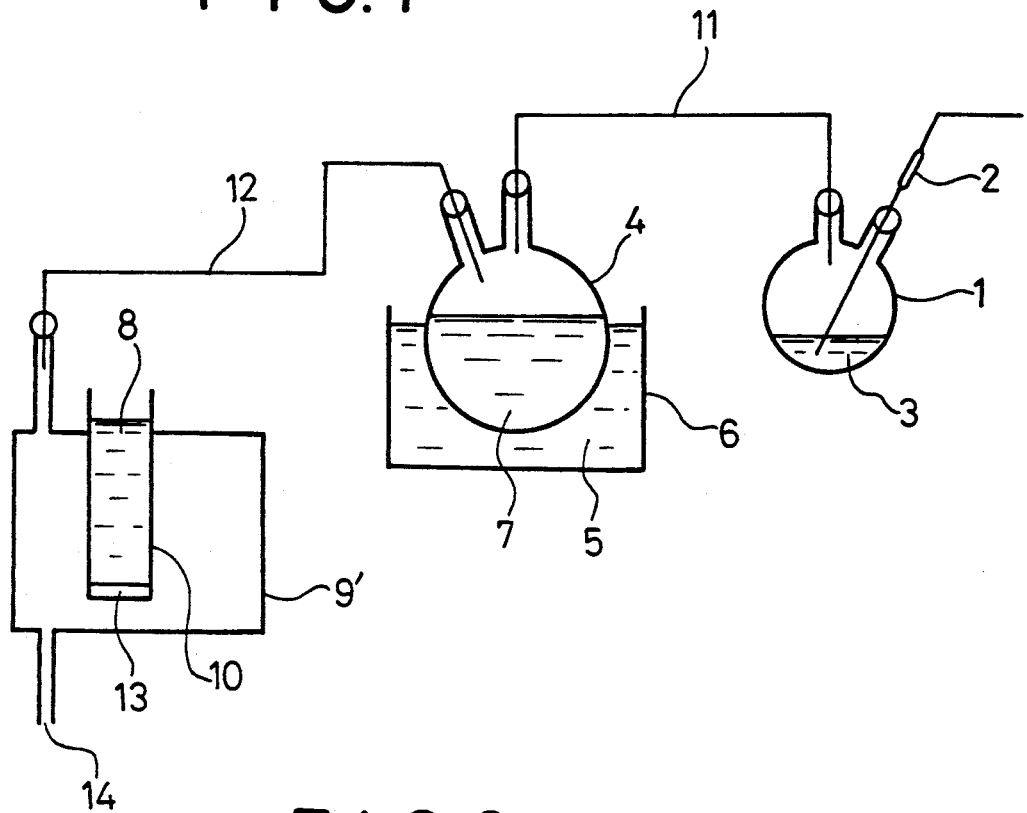
FIGS. 1 and 2 are schematic illustrations of exemplary apparatuses for making the gas separator of the present invention.

As stated above, Knudsen flow occurs when gas molecules pass through a pore having a diameter less than about one-tenth of their mean free path. Accordingly, in view of the fact that gas separation is carried out under a pressure in the vicinity of one atmosphere, Knudsen flow will occur when gas molecules pass through a pore having a diameter of not greater than about 100 Å.

In the practice of the present invention, a porous substrate having an average pore diameter of not greater than 100 Å is use considering the conditions under which Knudsen flow can occur while gas molecules pass from one surface of the porous substrate to the other. The present invention is further characterized in that a π-electron conjugated conducting polymer is retained within the pores of the porous substrate so as to allow a flow different from Knudsen flow (i.e., anomalous diffusion flow) to occur in the pore diameter range where Knudsen flow can occur. The present invention is directed to the application of this phenomenon to gas separation.

The pore diameter of such a membranous gas separator can be controlled to some degree by varying the amount of the π-electron conjugated conducting polymer retained therein. However, the use of a porous substrate having an average pore diameter of not greater than 100 Å makes it possible to obtain without fail a membranous gas separator having an average pore diameter of not greater than 100 Å without relying on the amount of the π-electron conjugated conducting polymer retained therein.

The term "anomalous diffusion flow" as used herein refers to a flow of gas molecules which is characterized in that the gas molecules pass through the pores of the gas separator while becoming adsorbed, in a monomolecular or polymolecular layer, to the π-electron conjugated conducting polymer retained therein and thus maintaining an interaction with the π-electron conjugated conducting polymer. Generally, within the pore diameter range where Knudsen flow can occur. Knudsen flow becomes predominant as the pore diameter increases, while anomalous diffusion flow becomes predominant as the pore diameter decreases. Under the same pressure and temperature conditions, a decrease in pore diameter causes an increase in the number of collisions between the gas molecules and the π-electron conjugated conducting polymer retained within the pores, and an increase in the proportion of the pore space in which an interaction can occur between the gas molecules and the π-electron conjugated conducting polymer. This means that the gas molecules flowing through the pores are more subject to interaction with the π-electron conjugated conducting polymer.

The porous substrate used in the present invention can be in the form of a flat membrane, a hollow fiber or a tube.

This porous substrate may consist of solely a porous layer having an average pore diameter of not greater than 100 Å, or of composite constructed with a finely porous layer having an average pore diameter of 100 Å and a porous layer having a larger pore diameter.

The pore diameter of the substrate need only satisfy the aforesaid requirement. However, if the content of coarser pores of the substrate increases, Knudsen flow will become predominant and the gas separability will decrease. On the other hand, if the content of finer pores of the substrate increases, the gas permeability will decrease. Accordingly, the pore diameter distribution of the substrate is preferably narrow. Specifically, it is preferable that not less than 50% by volume of the pores have diameters within the range of the average pore diameter $(d_p) \pm 20$ Å. Such a narrow pore diameter distribution is also preferable for the purpose of retaining the π-electron conjugated conducting polymer uniformly within the pores.

Further, in order to suppress Knudsen flow and make anomalous diffusion flow predominant, the average pore diameter is more preferably not greater than 80 Å and most preferably not greater than 50 Å.

Pore diameters can be determined by causing nitrogen, benzene, alcohol, water vapor or the like to become adsorbed in the pores and calculating them from Kelvin's equation on the basis of the capillary condensation theory. The term "pore diameter" as used herein refers to the value obtained by this method.

The porosity of the substrate should be such that its structural integrity is secured, and can range from about 5 to 90%. In view of the gas permeability and mechanical strength of the gas separator, the porosity of the substrate is more preferably from 25 to 85% and most preferably from 40 to 80%.

As the above-described porous substrate, there may be used various organic and inorganic porous substrates, provided that they have pores extending from one surface to the other and that a π-electron conjugated conducting polymer can be retained within the pores. Useful organic porous substrates include, for example, those formed of cellulose acetate, polyethylene, polycarbonates, polyacrylonitrile, nylon 66, nylon 6, polyesters, polysulfones, polyethersulfones, polyphenylene oxides, polyvinylidene fluoride and polytetrafluoroethylene. Useful inorganic porous substrates include, for example, porous glass, porous alumina, porous metals and porous compacts of finely powdered carbon.

However, in consideration of its thermal resistance and its use at elevated temperatures, the porous substrate is preferably formed of an inorganic material. For example, when the gas separator is used at an elevated temperature of the order of 120° C., the separation factor is reduced, but the permeation rate is markedly increased. Therefore, the separation efficiency can be improved by using an inorganic porous substrate.

Although the above-described porous substrate is used in the gas separator of the present invention, no particular limitation is placed on the position of the layer of pores in which the $\pi$-electron conjugated conducting polymer is retained. For example, the gas separator of the present invention can have any of the following structures.

(1) A structure in which the $\pi$-electron conjugated conducting polymer is retained within almost all of the pores of a porous substrate having an average pore diameter of not greater than 100 Å.

(2) A structure in which the $\pi$-electron conjugated conducting polymer is retained only within the pores forming a layer (a surface layer or a middle layer) in a porous substrate having an average pore diameter of not greater than 100 Å.

(3) A structure in which the porous substrate comprises a finely thin porous layer (layer A) having an average pore diameter of not greater than 100 Å and a porous supporting layer having an average pore diameter of greater than 100 Å and in which the $\pi$-electron conjugated conducting polymer is retained only within the pores of layer A. (Layer A may be located in the surface or interior of the pores substrate.)

(4) A structure in which the $\pi$-electron conjugated conducting polymer is retained within almost all of the pores of a porous substrate as described in paragraph (3) above.

In the porous substrates described in paragraphs (3) and (4) above, layer A preferably has a thickness of not greater than 50 $\mu$m.

Although the membranous gas separator of the present invention can have any of the above-described various structures, the structure described in paragraph (3) above is preferred in view of the amount of the -electron conjugated conducting polymer retained therein and the gas separation efficiency.

In such a gas separator, it is preferable that the thickness of the layer having the $\pi$-electron conjugated conducting polymer retained therein be not less than 0.05 $\mu$m and, at the same time, be as small as possible.

The $\pi$-electron conjugated conducting polymers which can be used in the present invention include polymers or copolymers prepared from five-membered heterocyclic compounds (such as pyrrole, N-methylpyrrole, thiophene and furan) or derivatives thereof; polymers or copolymers prepared from aromatic compounds (such as aniline, indole and phenylenediamine) or derivatives thereof; and polyacetylene.

In the gas separator of the present invention, the $\pi$-electron conjugated conducting polymer is retained within at least a part of the pores of the porous substrate in such a way that the pores are not blocked thereby. The expression "within the pores" means the inner surface of the pores and the internal space of the pores, and the expression "at least a part of the pores" means all or a part of the pores. The expression "in such a way that the pores are not blocked thereby" means that the $\pi$-electron conjugated conducting polymer is retained so as to leave a space extending from one surface of the porous substrate to the other.

The presence of pores blocked by the polymer is undesirable because this reduces the gas permeability of the gas separator. The presence of pores in which no polymer is retained is also undesirable because such pores allow a free flow of gases and cause a reduction in the gas separation factor. However, it is to be understood that such pores may be present if their proportion is low enough to have no substantial influence on the separation performance of the gas separator.

The presence or absence of blocked pores can be examined according to various methods. For example, if the pores of the porous substrate are not blocked, a gas which does not show any specific interaction with the conductive polymer will pass through the pores in Knudsen flow. Accordingly, the presence or absence of blocked pores can be examined by measuring the permeation rate of such a gas.

Alternatively, when the pressure dependence of the permeation rate of air which shows a specific interaction with the conductive polymer is measured, the oxygen (or nitrogen) permeation rate per unit differential pressure across the membrane will show a sharp increase on the lower-pressure or higher-pressure side if the pores are not blocked. Accordingly, the presence or absence of blocked pores can easily be examined by such measurement.

The method for making the gas separator of the present invention will be described hereinbelow.

The process of retaining a $\pi$-electron conjugated conducting polymer within the pores of a porous substrate (which process will hereinafter be referred to as "polymer deposition") can be accomplished by employing such techniques as electrolytic polymerization and chemical oxidative polymerization. For example, where an inorganic or organic porous substrate having no electrical conductivity is used, polymer deposition can be relatively easily achieved by employing chemical oxidative polymerization. In chemical oxidative polymerization, there may be used any combination of an oxidizing agent solution and a monomer solution, provided that polymerization takes place when these solutions are mixed.

Useful monomers include five-membered heterocyclic compounds such as pyrrole, N-methylpyrrole, thiophene, furan, aniline, indole and derivatives thereof; phenylenediamines; and acetylene. Useful oxidizing agents include hydrogen peroxide, nitric acid, sulfuric acid, ferric chloride, potassium persulfate, quinones, diazonium salts, ammonium cerium (IV) sulfate, and ammomnium cerium (IV) nitrate. Useful solvents include water, acetonitrile, acetone, and ethanol, as well as mixtures thereof.

Chemical oxidative polymerization, which involves contacting an oxidizing agent with a monomer to form a polymer, can be divided into three processes according to the method of contacting. They include the dipping process, the diaphragm process and the blending process.

The dipping process comprises dipping a porous substrate alternately in an oxidizing agent solution and a monomer solution to deposit a polymer within the pores of the porous substrate. The diaphragm process comprises disposing a porous substrate between an oxidizing agent solution and a monomer solution so that the monomer and the oxidizing agent diffuse into the porous substrate and contact with each other to form a $\pi$-electron conjugated conducting polymer therein. The blending process comprises previously incorporating a monomer or an oxidizing agent in a porous substrate and soaking this porous substrate in an oxidizing agent solution or a monomer solution to form a polymer.

Where the porous substrate has electrical conductivity, polymer deposition can be achieved by electrolytic polymerization. The monomer solution used for this purpose can be the same as that used for chemical oxidative polymerization.

In one embodiment, one surface of a non-conductive porous substrate is rendered electrically conductive according to a suitable technique such as metallization (or sputtering). Then, using the metallized surface as an electrode, electrolytic polymerization is carried out in a monomer-containing electrolytic solution. Thus, there can be obtained a gas separator having a $\pi$-electron conjugated conducting polymer deposited only on the metallized side of the porous substrate.

Alternatively, a similar gas separator can be obtained by masking one surface of a porous substrate and subjecting it to chemical oxidative polymerization (the dipping process).

Moreover, a $\pi$-electron conjugated conducting polymer can be deposited in the middle portion of a porous substrate by disposing the porous substrate, as a diaphragm, between an oxidizing agent solution and a monomer solution to effect chemical oxidative polymerization (the diaphragm process).

Furthermore, a $\pi$-electron conjugated conducting polymer can be deposited in a desired layer of a multilayer porous substrate by incorporating a monomer or an oxidizing agent in the layer and subjecting the porous substrate to chemical oxidative polymerization (the blending process).

As stated above, various types of chemical oxidative polymerization can be employed. A particularly preferably type includes a method for carrying out the polymerization at the gas-liquid interface by bringing one side of the porous substrate into contact with an oxidizing agent solution, and introducing a monomer vapor of the $\pi$-electron conjugated conducting polymer from the other side.

According to this method, when one side is brought into contact with the oxidizing agent solution and the monomer vapor capable of chemical oxidative polymerization is fed from the other side, the monomer vapor diffuses through the porous substrate along the pore wall and contacts with the oxidizing agent solution at the gas-liquid interface thereby retaining the resulting polymer on the pore wall. When a porous substrate composed of a microporous layer having an average pore diameter of not greater than 100 Å and of a porous layer having an average pore diameter of greater than 100 Å is used, it is preferable to bring the microporous layer side into contact with the oxidizing agent solution. When the porous layer side having the greater pore diameter is brought into contact with the liquid phase, it becomes difficult to uniformly retain the separating layer over the whole substrate, and the washing step after polymer deposition also become complex.

Procedures for introducing the monomer vapor into the porous substrate include, for example, a heat vaporization method in which a monomer liquid is evaporated by heating and the resulting vapor is introduced into the porous substrate, a reduced pressure method in which the gas phase side is maintained under negative pressure and the evolved monomer vapor is introduced into the porous substrate, and a carrier gas method in which carrier gas is fed into the monomer liquid for bubbling and the resulting vapor mixture of the monomer and the carrier gas is introduced into the porous substrate. However, the carrier gas method is most preferable in view of the condensation performance and diffusion performance of the monomer in the pores, the simplicity of polymerization apparatus, and the reduced thickness of the resulting separating layer.

When the vapor-phase side is placed under positive pressure in the carrier gas method, the carrier gas bubbles in the liquid-phase side of the substrate and uniformity of the separating layer is decreased. Thus, it is preferable to avoid a pressure difference between the vapor- and liquid-phase sides.

The composition of the monomer vapor may be a monomer alone or a mixture of a monomer vapor and the carrier gas. A mixture of the vapor with a vapor of a suitable solvent is preferably used in order to improve the wettability and the diffusion performance of the monomer to the pores. Preferable solvents prevent swelling of the porous substrate and variation of the pore diameter.

The thickness of the separating layer can be controlled by the concentration and feeding time of the monomer vapor. The thickness of the separating layer increases with the feeding time. In order to obtain a membrane having a high separation factor and permeation rate, the polymer deposition time is preferably 1 to 30 minutes, more preferably 1 to 5 minutes. A time exceeding 30 minutes tends to cause blocking of the pore in the vicinity of surface contacting with the liquid phase and leads to a decrease in permeation rate.

The membranous gas separators made in the above-described manner have excellent characteristics suitable for use in the separation and concentration of gases. Moreover, if their affinity for the solute is increased, they can be expected to exhibit unique separating power in the separation of the solvent by the permeative vaporization process or reverse osmosis process.

More specifically, it is known that, when a $\pi$-electron conjugated conducting polymer is formed by chemical oxidative polymerization or electrolytic polymerization, anionic molecules can be incorporated as dopants into the polymer. In chemical oxidative polymerization, for example, the combined use of pyrrole and $FeCl_3$ makes it possible to incorporate $Cl^-$ as a dopant into the polymer. The permeability of the gas separator can be modified by varying the type and amount of the dopant. Further, functional molecules (e.g., molecules serving as metal ion carriers or oxygen carriers) can also be introduced as dopants into the polymer, provided that they are anionic.

The present invention is further illustrated by the following examples. However, these examples are not to be construed to limit the scope of the invention.

In these examples, the pore diameter distribution, pore volume and average pore diameter of the porous substrate were determined according to the following procedures.

(1) PORE DIAMETER DISTRIBUTION

At a fixed temperature, the amount of nitrogen gas adsorbed to the porous substrate was determined under varying gas pressures to obtain an adsorption isotherm of nitrogen gas. On the assumption that the pores were in the form of a cylinder having a radius $r_p$, the value of $r_p$ was calculated from Kelvin's equation. The pore diameter was considered to be equal to $2r_p$.

(2) PORE VOLUME

The pore volume was determined by integrating the area under the pore diameter distribution curve obtained in (1). The percentage of pore volume for a specific pore diameter range was determined by integrating the area under the distribution curve according to the following equation.

$$V(\%) = \frac{\int_{r_{p1}}^{r_{p2}} \left[\frac{dV_p}{dr_p}\right] dr_p}{\int_0^\infty \left[\frac{dV_p}{dr_p}\right] dr_p} \times 100$$

where $r_p$ is equal to ½ $d_p$ and $d_p$ is the pore diameter.

(3) AVERAGE PORE DIAMETER

The average pore diameter, $d_p$ was considered to be equal to double the pore radius, $\bar{r}_p$, corresponding to the peak of the pore diameter distribution curve obtained in (1).

In the drawings, 1 is the monomer vessel, 2 is a glass capillary, 3 is the monomer, 4 is the solvent vessel, 5 is water, 6 is the water vessel, 7 is the solvent, 8 is the oxidizing agent solution, 9 and 9' are the polymerization cells, 10 is the substrate tube, 11 is a pipe, 12 is a pipe, 13 is a sealant, 14 is a leak outlet, 15 is an ultrasonic cleaner, 16 is water, 17 is a glass container, 18 is either solvent, monomer or oxidizing solution, 19 is a porous substrate, 20 is a cork, 21 is an aspirator and 22 is a manometer.

EXAMPLE 1

A ceramic tube of unsymmetrical structure (MEMBRALOX media: manufactured by Toshiba Ceramics Co., Ltd.) was used as a porous substrate. This tube has an outer diameter of 19 mm, an inner diameter of 15 mm, and an average pore diameter of 15 μm, and was equipped on the inner surface with a finely porous layer having a thickness of 15 μm, an average pore diameter of 40 Å, characterized in that 75% by volume of the pores had diameters within the range of 20 to 60 Å. Using the apparatus illustrated in FIG. 1, a membranous gas separator of the present invention was prepared by the following procedures.

One end of the porous substrate tube 10 was sealed with a two component type polyurethane adhesive and the tube was then filled with a 0.3M acetonitrile solution of ferric chloride hexahydrate ($FeCl_3 \cdot 6H_2O$). The substrate tube 10 thus obtained was fitted in a polymerization cell 9' and nitrogen carrier gas was introduced from a glass capillary 2 at a rate of 50 cc/min. A liquid monomer (pyrrole) was bubbled and the vapor mixture of the monomer and nitrogen was passed through a pipe 11 and introduced into a solvent vessel 4 which was filled with acetonitrile. Thus, the vapor mixture of the monomer and nitrogen was further mixed with acetonitrile vapor. The resulting mixture was passed through a pipe 12 and introduced for 3 minutes into the outer periphery of the porous substrate fitted on the polymerization cell 9' to carry out polymer deposition.

After completion of polymer deposition, the acetonitrile solution of ferric chloride hexahydrate was discharged and the porous substrate was taken out, washed with acetonitrile and dried at 60° C. for 2 hours under a reduced pressure of 10 mmHg.

The membranous gas separator thus obtained had a black inner surface and the color of the outer surface was unchanged.

The electrical resistances of the inner surface and outer surface of this membranous gas separator was 20 kΩ/cm and over 30 MΩ/cm, respectively. The thickness of the resulting separating layer was 2.5 μm by SEM measurement.

The air permeation rate ($qO_2$, $qN_2$) was measured at 30° C. at a feed-side pressure of 150 mmHg and a permeation-side pressure of less than $2 \times 10^{-1}$ mmHg. The results are illustrated in Table 1.

Figure 3:
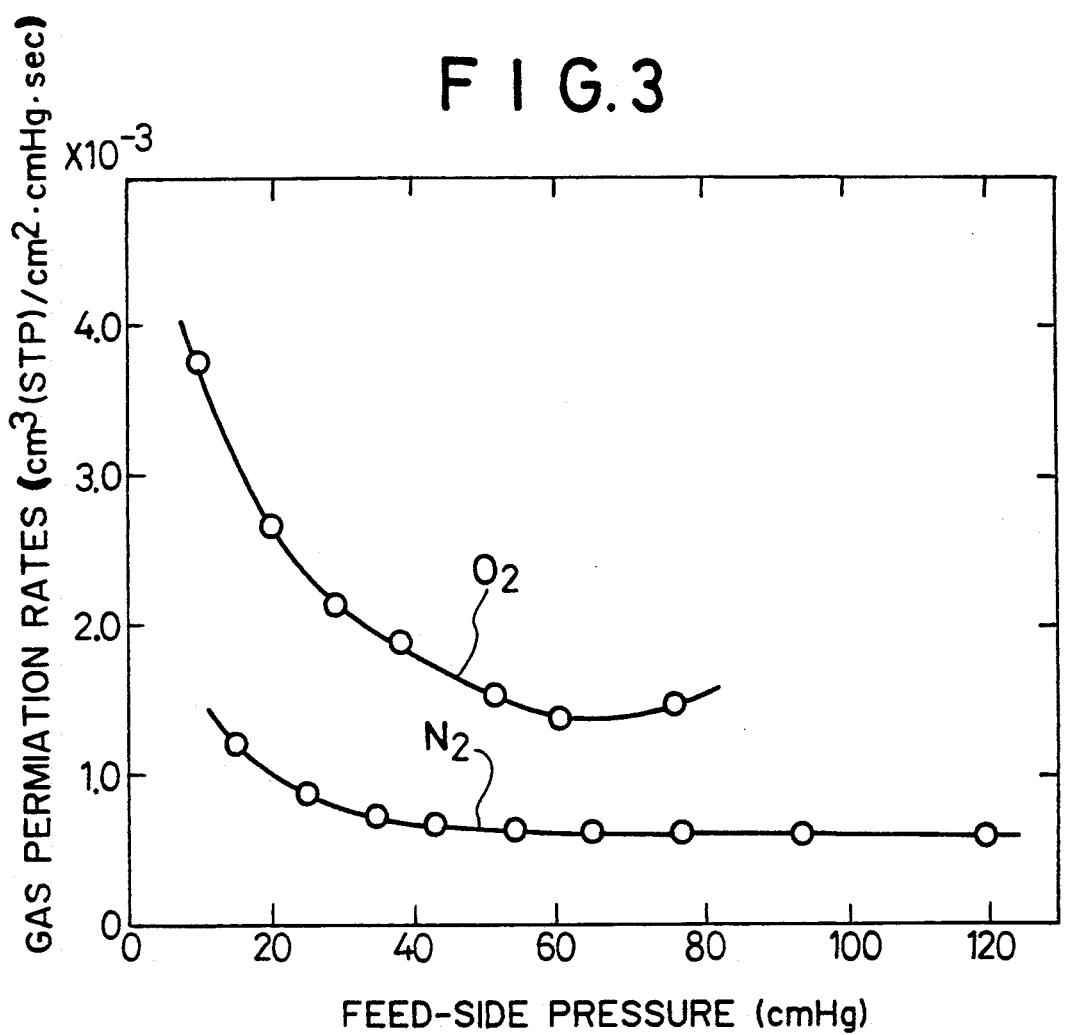
FIG. 3 is a graph showing the gas pressure dependence of the gas permeation rates of the gas separator obtained in Example 1.

Then, the pressure dependence of the oxygen permeation rate and the nitrogen permeation rate of this membranous gas separator was evaluated. Measurement was carried out at a permeation-side pressure of less than $2 \times 10^{-3}$ cmHg and a feed-side pressure in the range of 5 to 300 mmHg. The results obtained are illustrated in FIG. 3. The increased gas permeation rate both on the low-pressure and high-pressure sides revealed that the pores of the substrate were not blocked.

EXAMPLE 2

The same polymer deposition procedures as described in Example 1 were carried out, except that carrier gas was introduced for 10 minutes.

The resulting membranous gas separator had an electrical resistance of 10 kΩ/cm on the inner surface and over 30MΩ/cm on the outer surface. The thickness of separating layer was 12 μm.

The air permeation rate was measured in the same manner as described in Example 1. The results are illustrated in Table 1. The permeation rate had the same pressure dependence as in Example 1.

EXAMPLE 3

Figure 2:
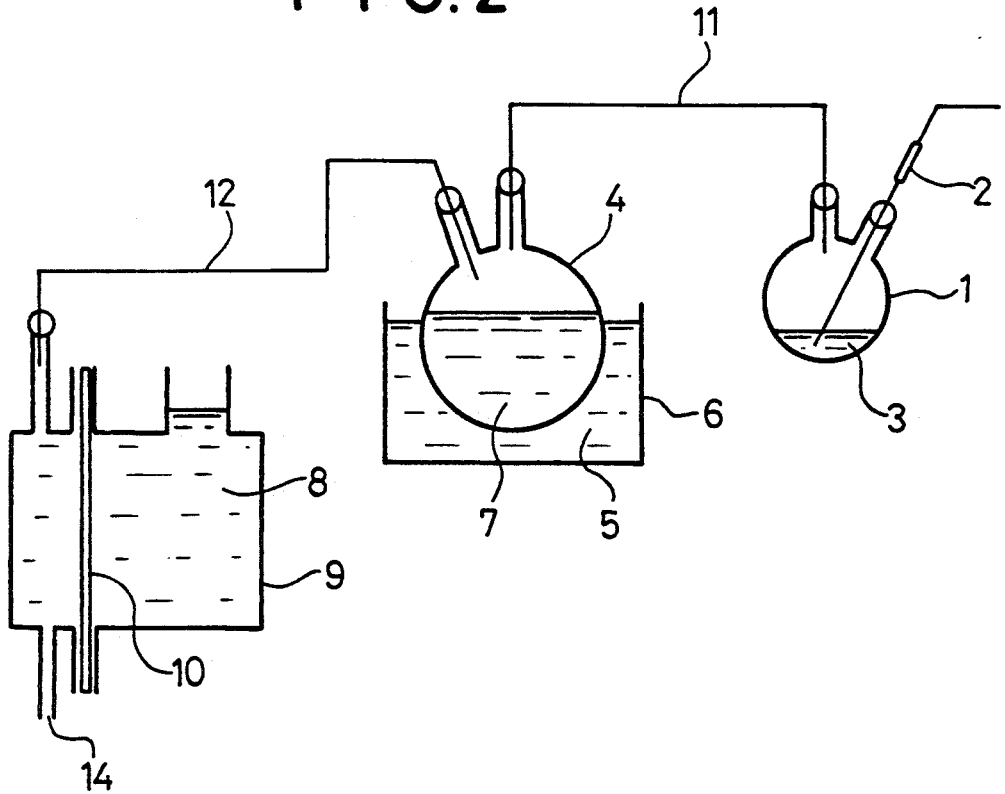

A plate of porous glass (Vycor Glass #7930; manufactured by Dow Corning Co.) was used as a porous substrate. The plate had a thickness of 1.1 mm, a length of 5 cm, a porosity of 28% and an average pore diameter of 44 Å, characterized in that 80% by volume of the pores had diameters within the range of 24 to 64 Å. Using the apparatus illustrated in FIG. 2, a membranous gas separator of the present invention was prepared by the following procedures.

The porous substrate 10 was fitted in a separable type polymerization cell 9 and the right side was filled with a 0.3M acetonitrile solution of ferric chloride hexahydrate. Nitrogen gas was introduced as a carrier gas through a glass capillary 2 at a rate of 50 cc/min. A liquid monomer (N-methylpyrrole) in a monomer vessel 1 was bubbled and the vapor mixture of the monomer and nitrogen was passed through a pipe 11 and introduced into a solvent vessel 7 which was filled with acetonitrile. Thus, the vapor mixture of the monomer and nitrogen was further mixed with acetonitrile vapor. The resulting mixture was passed through a pipe 12 and introduced for 20 minutes into the left side of the porous substrate fitted on the polymerization cell 9.

After completion of polymer deposition, the acetonitrile solution of ferric chloride hexahydrate was discharged and the porous substrate was taken out, washed with acetonitrile and dried at 60° C. for 2 hours under reduced pressure of 10 mmHg.

The resulting membranous gas separator was black only on the liquid phase side which was in contact with the oxidizing agent solution. The color of the vapor phase side was unchanged.

The electrical resistance of the liquid-phase side and the vapor-phase side of the membranous gas separator was 25 k$\Omega$/cm and over 30M$\Omega$/cm, respectively. The thickness of the separating layer was 10 $\mu$m by SEM measurement.

The air premeation rate was measured in the same manner as described in Example 1. The results are illustrated in Table 1.

EXAMPLE 4

Polymer deposition was carried out in the same manner as described in Example 1, except that aniline was used as the monomer and celium ammonium nitrate was used as the oxidizing agent.

The air permeation rate was measured in the same manner as described in Example 1. The results are illustrated in Table 1.

EXAMPLE 5

Figure 4:
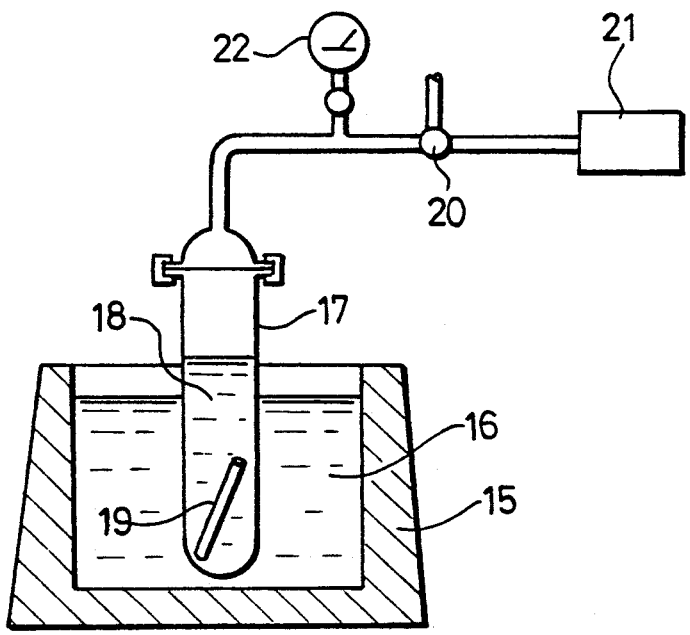
FIG. 4 is a schematic illustration of an exemplary apparatus suitable for making the gas separator of the present invention.

A gas separator was made by use of a porous substrate comprising a ceramic tube of unsymmetrical structure (MEMBRALOX medium; manufactured by Toshiba Ceramics Co.) having an outer diameter of 19 mm, an inner diameter of 15 mm and an average pore diameter of 15 $\mu$m and including, on the inner surface side, a finely porous layer having a thickness of 15 $\mu$m and an average pore diameter of 40 Å and characterized in that 75% by volume of the pores had diameters within the range of 20–60 Å. To this end, the following process steps were carried out by using the apparatus illustrated in FIG. 4.

STEP 1

Acetonitrile and the aforesaid porous substrate were placed in a sealable glass container (3), which was evacuated to 50 mmHg by means of an aspirator. Then, the container was placed in an ultrasonic cleaner (Model B12; manufactured by Branson Co.) filled with water, and the porous substrate was cleaned by exposure to ultrasonic waves for 10 minutes.

STEP 2

After the acetonitrile within the container was replaced by a 0.3M solution of $FeCl_3 \cdot 6H_2O$ in acetonitrile, the container was evacuated and then exposed to ultrasonic waves for 5 minutes.

STEP 3

After the solution within the container was replaced by a 0.3M solution of N-methylpyrrole in acetonitrile, the container was evacuated and then exposed to ultrasonic waves for 5 minutes. (Usually, Steps 2 and 3 are repeated several times, and the number of repetitions will hereinafter be referred to as "the number of polymer depositions".)

STEP 4

After completion of polymer depositions, the porous substrate was cleaned in the same manner as described in Step 1.

STEP 5

After cleaning, the porous substrate was vacuum-dried at 10 mmHg and 60° C. for 4 hours.

The inner surface layer of the resulting gas separator assumed a uniform black color, indicating that the polymer was retained uniformly therein. In contrast, the outer surface side thereof assumed a gray color.

The electrical resistance of this gas separator was 25 k$\Omega$/cm on the inner surface side and higher than 30M$\Omega$/cm on the outer surface side. By setting the feed-side pressure at 150 cmHg and the discharge-side pressure at $2 \times 10^{-1}$ cmHg or less, the air ($O_2$, $N_2$) permeation rate was measured at 30° C. and the $O_2/N_2$ separation factor was calculated. The values thus obtained are shown in Table 2. In this experiment, feed gas was the air and the volume and the components of the permeated gas ($O_2$, $N_2$) were analyzed by gas chromatography.

The $O_2$ permeation rate was $7.50 \times 10^{-5}$ cm$^3$ (STP)/cm$^2$·cmHg·sec (this unit will hereinafter be abbreivated as RU), the $N_2$ permeation rate was $2.33 \times 10^{-5}$ RU, and the $O_2/N_2$ separation factor was as high as 3.23. When calculated on the assumption that the membrane thickness was 15 $\mu$m, the $O_2$ permeability was $(7.50 \times 10^{-5} \times 15 \times 10^{-4}=)$ $1.12 \times 10^{-7}$ cm$^3$ (STP)·cm/cm$^2$·cmHg·sec.

Figure 5:
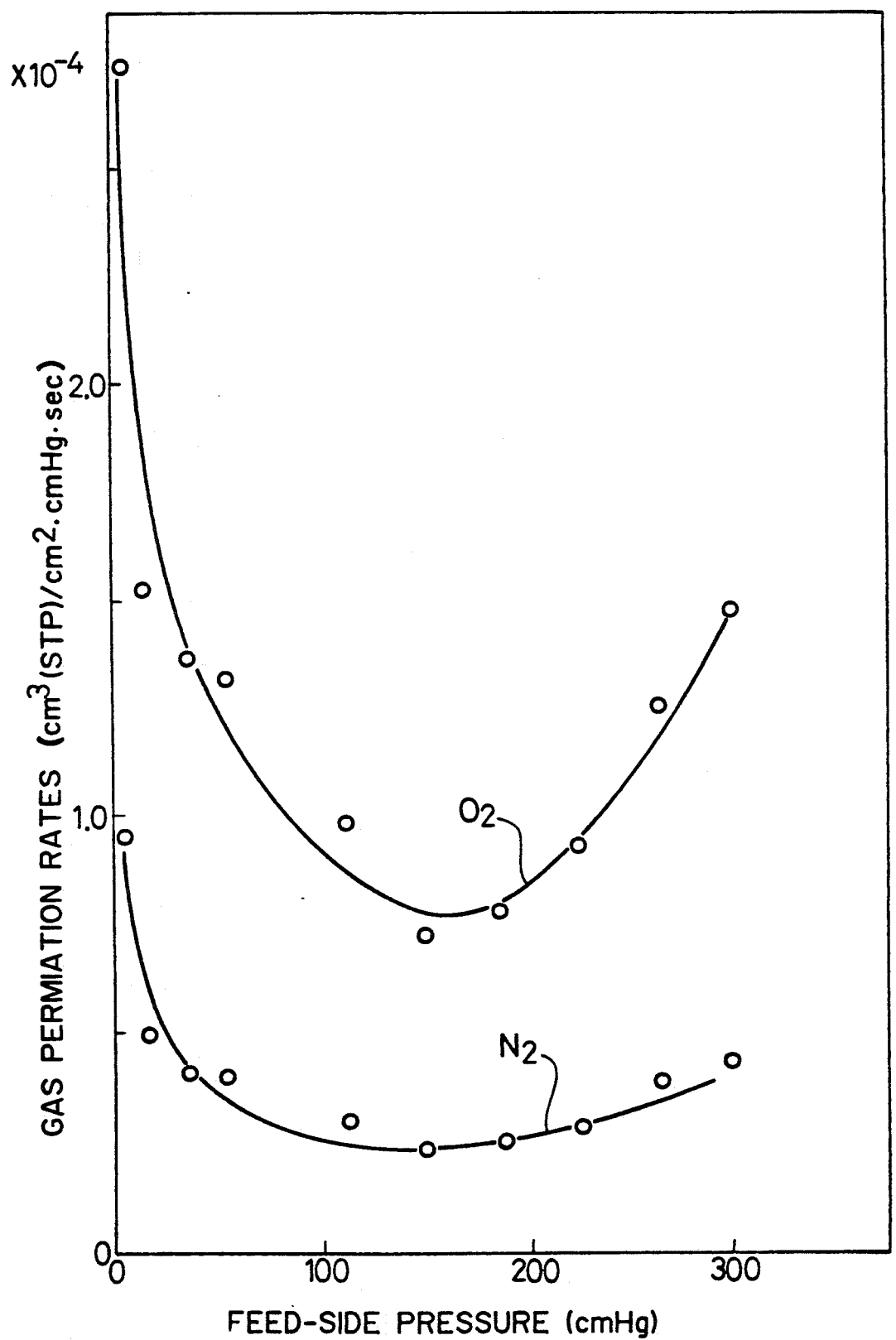
FIG. 5 is a graph showing the pressure dependence of the gas permeation rates of the gas separator obtained in Example 5.

Then, the pressure dependence of the $O_2$ and $N_2$ permeation rates of this gas separator was evaluated. Measurements were made by setting the initial discharge-side pressure at $2 \times 10^{-1}$ cmHg or less and varying the feed-side pressure from 6 to 300 cmHg, and the results thus obtained are shown in FIG. 5. It can be seen from FIG. 5 that the gas permeation rates increase on both the lower-pressure side and the higher-pressure side.

Generally, the permeation of gases through a homogeneous membrane can be explained on the basis of Henry's solution-diffusion mechanism. If a gas permeates through a membrane by Henry's solution-diffusion mechanism, the gas permeation rate will not depend on pressure and, therefore, will not show any increase on the lower-pressure side and the higher-pressure side as noted in FIG. 5. That is FIG. 5 indicates that gases permeate through this gas separator by a mechanism different from Henry's solution-diffusion mechanism. Additionally, oxygen having a higher molecular weight permeates faster than nitrogen having a lower molecular weight. This suggests that gases permeate through this gas separator in anomalous diffusion flow.

Thus, the pressure dependence of the $O_2$ and $N_2$ permeation rates can be utilized to determine whether the $\pi$-electron conjugated conducting polymer is retained within the pores of the porous substrate in such a way that the pores are not blocked thereby.

TABLE 1

| No. of Example or Comparative Example | Gas permeation rate (RU) | | $O_2/N_2$ separation factor |
|---|---|---|---|
| | $O_2$ | $N_2$ | |
| Example 1 | $2.6 \times 10^{-4}$ | | 4.0 |
| Example 2 | $2.0 \times 10^{-3}$ | | 3.7 |
| Example 3 | $3.0 \times 10^{-6}$ | | 3.9 |
| Example 4 | $8.5 \times 10^{-4}$ | $2.8 \times 10^{-4}$ | 3.0 |

RU: cm$^3$ (STP)/cm$^2$ · cmHg · sec

TABLE 2

| No. of Example or Comparative Example | Electrical resistance across wall (k$\Omega$) | Gas permeation rate (RU) | | $O_2/N_2$ separation factor |
|---|---|---|---|---|
| | | $O_2$ | $N_2$ | |
| Example 5 | — | $7.50 \times 10^{-5}$ | $2.33 \times 10^{-5}$ | 3.23 |
| Example 6 | — | $5.50 \times 10^{-5}$ | $1.05 \times 10^{-5}$ | 5.24 |
| Comparative | — | $2.02 \times 10^{-1}$ | $2.20 \times 10^{-1}$ | 0.92 |

TABLE 2-continued

| No. of Example or Comparative Example | Electrical resistance across wall (kΩ) | Gas permeation rate (RU) O$_2$ | N$_2$ | O$_2$/N$_2$ separation factor |
| --- | --- | --- | --- | --- |
| Example 1 | | | | |
| Example 7 | 300–400 | 8.50 × 10$^{-7}$ | 2.74 × 10$^{-7}$ | 3.10 |
| Example 8 | 150–200 | 2.97 × 10$^{-7}$ | 9.86 × 10$^{-8}$ | 3.0 |
| Example 9 | 90–150 | 9.62 × 10$^{-8}$ | 1.40 × 10$^{-8}$ | 6.9 |
| Example 10 | 300–400 | 4.70 × 10$^{-8}$ | 1.75 × 10$^{-8}$ | 2.7 |
| Example 11 | 300–400 | 3.48 × 10$^{-8}$ | 6.54 × 10$^{-9}$ | 5.3 |
| Comparative Example 2 | >30000 | 1.42 × 10$^{-5}$ | 1.51 × 10$^{-5}$ | 0.94 |
| Example 12 | — | 5.45 × 10$^{-6}$ | 1.82 × 10$^{-6}$ | 2.99 |
| Example 13 | — | 2.23 × 10$^{-6}$ | 1.40 × 10$^{-6}$ | 1.59 |

EXAMPLE 6

A gas separator was made in the same manner as described in Example 5, except that pyrrole was used in place of N-methylpyrrol and the number of polymer depostions was 3. The results thus obtained are shown in Table 2.

COMPARATIVE EXAMPLE 1

Prior to polymer deposition, the air permeation rate of the ceramic tube used in Example 5 was measured and the O$_2$/N$_2$ separation factor was calculated. The results thus obtained are shown in Table 2.

The separation factor was in substantial agreement with the value $[(1/\sqrt{32})/(1/\sqrt{28})=0.94]$ predicted from Knudsen flow, suggesting that the gases permeated through the ceramic tube by Knudsen flow.

EXAMPLE 7

A gas separator was made by use of a porous substrate comprising a porous glass tube (Vycor Glass #7930; manufactured by Dow Corning Co.) having an average pore diameter of 44 Å, a porosity of 28%, an outer diameter of 7 mm, a wall thickness of 1.1 mm and a length of 5 cm and characterized in that 80% by volume of the pores had diameters within the range of 24–64 Å. The conditions employed in this example were the same as those employed in Example 5, except that the concentrations of FeCl$_3$.6H$_2$O and N-methylpyrrole used in Steps 2 and 3 were both 0.6M and the number of polymer depositions was 4.

In the first polymer deposition, the glass tube became dark upon completion of Step 3. After completion of four polymer depositions, the glass tube lost its transparency and assumed a black color.

The electrical resistance across the wall of the resulting gas separator was measured at five locations. In addition, by setting the feed-side pressure at 150 cmHg and the discharge-side pressure at 2×10$^{-1}$ cmHg or less, the air permeation rate was measured at 30° C. The results thus obtained are shown in Table 2. When calculated on the assumption that the membrane thickness was 1.1 mm, the O$_2$ permeability was 9.35×10$^{-8}$ cm$^3$ (STP)·cm/cm$^2$·cmHg·sec.

The electrical resistance was low and the O$_2$/N$_2$ separation factor was high. It can be seen from the value of the electrical resistance that a polymer of N-methylpyrrole was retained within the pores to form electrically conducting paths.

Further, by setting the feed-side pressure at 152 cmHg and the discharge-side pressure at 2×10$^{-1}$ cmHg or less, the permeation rates of various pure gases (namely, He, CO$_2$, O$_2$, Ar and N$_2$) were measured at 30° C. The results thus obtained are shown in Table 3. It can be seen from the data of Table 3 that the membraneous gas separator of the present invention can be applied to the separation of various gases.

This gas separator had a specific surface area of 230 m$^2$/g as measured by the BET method, and this value was somewhat smaller than that of the porous substrate (i.e., 250 m$^2$/g). However, it can be seen from this value that the pores of the porous glass were scarcely blocked.

Figure 6:
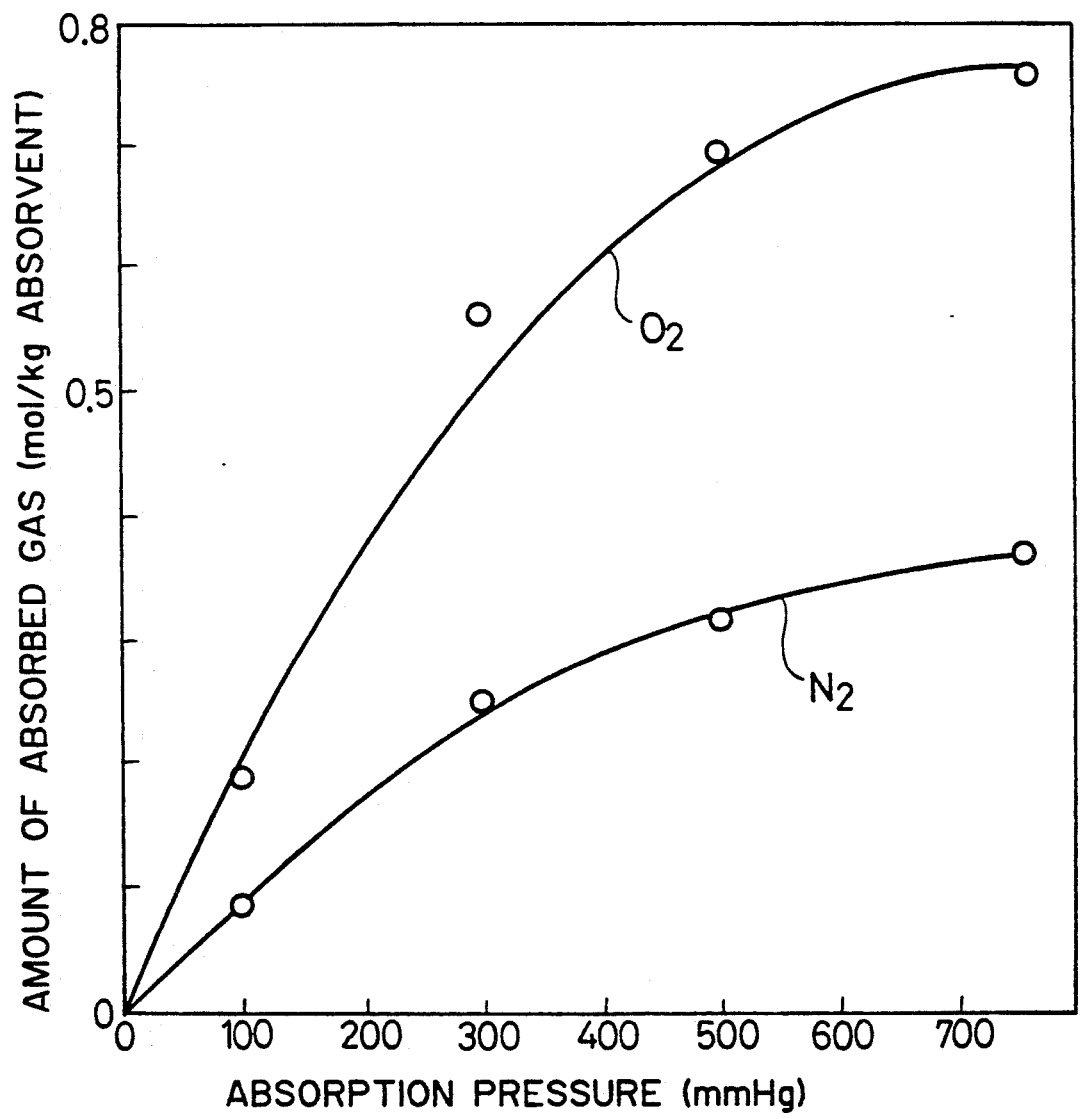
FIG. 6 is a graph showing the adsorption isotherms of $O_2$ and $N_2$ for the ground product (the π-electron conjugated conducting polymer) of the gas separator obtained in Example 7.
Figure 7:
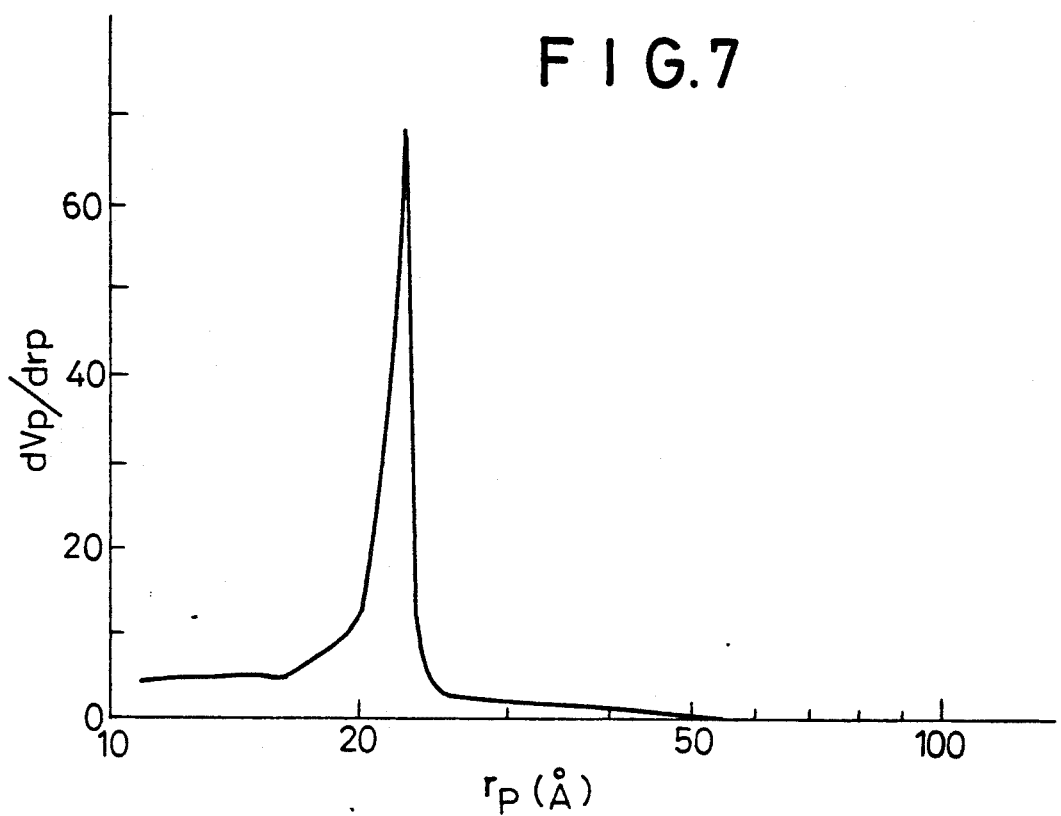
FIGS. 7 and 8 are graphs showing the pore diameter distribution of the porous glass substrates used in Examples 7 and 13, respectively.

In addition, this gas separator was finely ground and used to determine the adsorption isotherms (at 23° C.) of O$_2$ and N$_2$. The results thus obtained are plotted in the graph of FIG. 6. In FIG. 6, the ordinate indicates the amount of gas adsorbed to poly(N-methylpyrrole). For both O$_2$ and N$_2$, the time required to reach an adsorption equilibrium was within 5 minutes and the adsorption rate was high.

TABLE 3

| Type of gas | Permeation rate (RU) | Relative permeation rate as compared with N$_2$ gas |
| --- | --- | --- |
| He | 3.49 × 10$^{-6}$ | 48.1 |
| CO$_2$ | 1.27 × 10$^{-6}$ | 17.5 |
| O$_2$ | 3.72 × 10$^{-7}$ | 5.12 |
| Ar | 1.59 × 10$^{-7}$ | 2.18 |
| N$_2$ | 7.26 × 10$^{-8}$ | 1.00 |

EXAMPLE 8

Using the same porous substrate as used in Example 7, a gas separator was made in the same manner as described in Example 5, except that the number of polymer depositions was 6. The results thus obtained are shown in Table 2. When the feed-side pressure was reduced to 15 cmHg and the gas permeation rates were measured again, the O$_2$ permeation rate was 6.1×10$^{-7}$ RU, the N$_2$ permeation rate was 2.0×10$^{-7}$ RU, and the separation factor was 3.1. Thus, an increase in gas permeation rates on the lower-pressure side was noted.

EXAMPLE 9

A gas separator was made in the same manner as described in Example 8, except that the number of polymer depositions was 10. The results thus obtained are shown in Table 2.

When the feed-side pressure was reduced to 15 cmHg and the gas permeation rates were measured again, the O$_2$ permeation rate was 17.4×10$^{-8}$ RU, the N$_2$ permeation rate was 3.0×10$^{-8}$ RU, and the separation factor was 5.8. Thus, an increase in gas permeation rates on the lower-pressure side was noted.

EXAMPLE 10

A gas separator was made in the same manner as described in Example 9, that pyrrole was used in place of N-methylpyrrole and the number of polymer depositions was 3. The results thus obtained are shown in Table 2.

When the feed-side pressure was reduced to 15 cmHg and the gas permeation rates were measured again, the O$_2$ permeation rate was 13.3×10$^{-8}$ RU, the N$_2$ permeation rate was 4.43×10$^{-8}$ RU, and the separation factor was 3.0. Thus, an increase in gas permeation rates on the lower-pressure side was noted.

EXAMPLE 11

A gas separator was made in the same manner as described in Example 10, except that the acetonitrile used as the solvent in Steps 1–4 was replaced by deionized water. The results thus obtained are shown in Table 2.

When calculated on the assumption that the membrane thickness was 1.1 mm, the $O_2$ permeability was $3.82 \times 10^{-9}$ $cm^3(STP) \cdot cm/cm^2 \cdot cmHg \cdot sec$.

COMPARATIVE EXAMPLE 2

Prior to polymer deposition, the electrical resistance across the wall of the porous glass tube used in Example 7 and the gas permeation rates thereof were measured. The results thus obtained are shown in Table 2.

EXAMPLE 12

Both ends of the same porous glass tube as used in Example 4 were closed (so as to prevent the liquid from entering its internal space). Using this porous glass tube, a gas separator was made in the same manner as described in Example 4, except that the time of exposure to ultrasonic waves in Steps 2 and 3 was 30 seconds, respectively. Thus, poly(N-methylpyrrole) was deposited in the pores located on the outer surface side of the porous glass tube.

In the gas separator thus obtained, a block layer having a thickness of about 200 μm was present on the outer surface side. The electrical resistance of its outer surface was 20–30 kΩ/cm.

EXAMPLE 13

Figure 8:
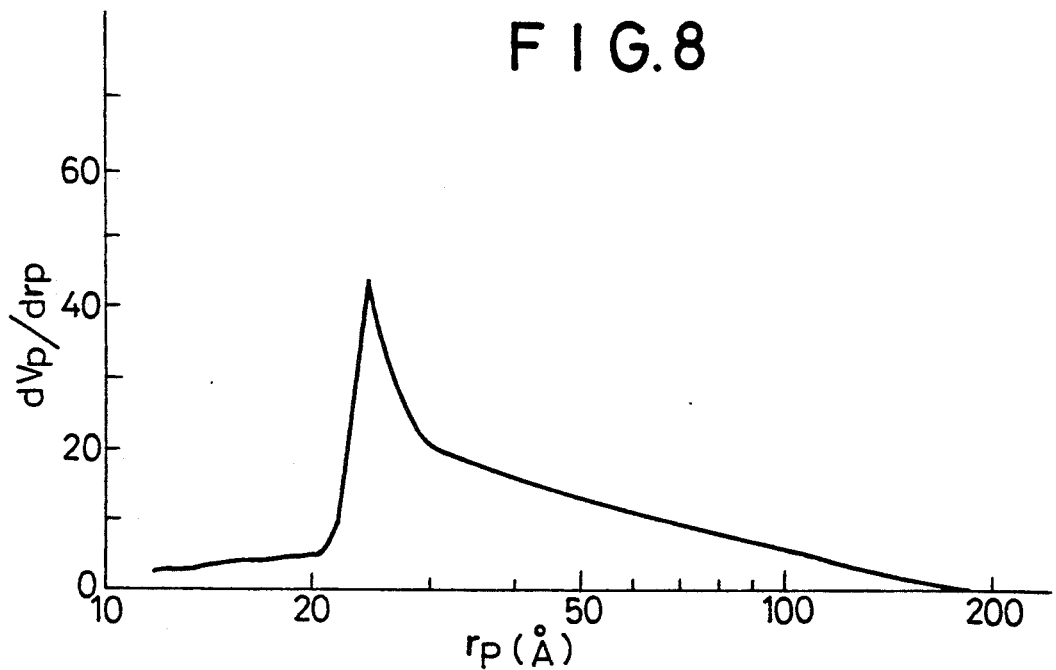

Borosilicate glass was melted and formed into a tube having the same size as that of the porous glass tube of Example 7. After this tube was heat-treated to effect phase separation, the soluble components were leached with 0.5M hot sulfuric acid to obtain a porous glass tube. This porous glass tube was washed and dried, and its pore diameter distribution was determined according to the nitrogen adsorption method. The results thus obtained are shown in FIG. 8. The average pore diameter ($2\bar{r}_p$) was 50 Å, but the percentage of pores having diameters within the range of 30–70 Å was 48%.

Using this porous glass tube, a gas separator was made in the same manner as described in Example 7. The air permeation rate of this gas separator was measured and the results thus obtained are shown in Table 2.

The membranous gas separators obtained in the foregoing examples of the present invention had a high $O_2/N_2$ separation factor within the range of about 1.6 to 6.9 and an $O_2$ permeability of the order of $10^{-7}$ to $10^{-9}$ $cm^3(STP) \cdot cm/cm^2 \cdot cmHg \cdot sec$.

What is claimed is:

1. A membranous gas separator comprising (a) a porous inorganic substrate consisting of a finely porous layer having an average pore diameter of not greater than 100 Å and a porous layer having an average pore diameter of greater than 100 Å, and (b) a π-electron conjugated conducting polymer retained within at least a part of the pores of said finely porous layer in such a way that the pores are not blocked thereby.

2. A gas separator as claimed in claim 1 wherein not less than 50% by volume of the pores of said finely porous layer have diameters within the range of the average pore diameter ±20 Å.

3. A gas separator as claimed in claim 1 or 2 wherein, in said finely porous layer, the layer having the π-electron conjugated polymer retained therein has a thickness of 0.05 to 50 μm.

4. A gas separator as claimed in claim 1 wherein the π-electron conjugated polymer is a polymer prepared from a five-membered heterocyclic compound.

5. A gas separator as claimed in claim 1 wherein the π-electron conjugated polymer is a polymer prepared from aniline.

* * * * *